United States Patent
Reitsch, Jr.

(10) Patent No.: US 6,422,153 B1
(45) Date of Patent: Jul. 23, 2002

(54) CAR WASH CONVEYOR TRACK SECTION CONSTRUCTION AND COMBINED CHAIN TAKE UP AND ROLLER CONTROL UNIT THEREFOR

(76) Inventor: Gilbert J. Reitsch, Jr., 6369 Mockingbird La., Clarkston, MI (US) 48346

( * ) Notice: Subject to any disclaimer, the term of this patent is extended or adjusted under 35 U.S.C. 154(b) by 0 days.

(21) Appl. No.: 09/729,615

(22) Filed: Dec. 4, 2000

(51) Int. Cl.[7] ............................................... B61B 10/04
(52) U.S. Cl. .................... 104/172.3; 104/165; 104/162; 104/172.1; 198/732; 198/836
(58) Field of Search ........................ 104/172.1, 172.3, 104/172.4, 172.5, 165, 162; 198/732, 721, 722, 733, 860.2

(56) References Cited

U.S. PATENT DOCUMENTS

| | | | | |
|---|---|---|---|---|
| 4,266,482 A | * | 5/1981 | Barber ................... | 104/172 B |
| 4,576,098 A | * | 3/1986 | Belanger et al. ......... | 104/172.3 |
| 4,715,287 A | * | 12/1987 | Wentworth et al. ...... | 104/172.3 |
| 4,856,646 A | * | 8/1989 | Sjostrand ................. | 198/836.1 |
| 5,724,785 A | * | 3/1998 | Malanowski ................ | 53/48.1 |
| 6,161,682 A | * | 12/2000 | Sarig ....................... | 104/172.3 |

* cited by examiner

Primary Examiner—S. Joseph Morano
Assistant Examiner—Frantz F. Jules
(74) Attorney, Agent, or Firm—John R. Benefiel (57) ABSTRACT

A car wash conveyor including a simplified and improved track structure using cut out flat support plates for mounting three tiers of tracks. The support plates allow equal widths of an intermediate and lower track, and incorporation of integral stanchions for support of tire guide rollers. The chain take up mechanism and the roller control mechanism together form an assembly able to be installed into the conveyor or removed for service as a single unit.

14 Claims, 9 Drawing Sheets

CAR WASH CONVEYOR TRACK SECTION CONSTRUCTION AND COMBINED CHAIN TAKE UP AND ROLLER CONTROL UNIT THEREFOR

BACKGROUND OF THE INVENTION

This invention concerns car wash conveyors of the type using a chain driven pusher rollers selectively elevated to engage a tire of a vehicle to advance the vehicle along a track on which the vehicle tires roll.

U.S. Pat. No. 4,864,936 describes a particular roller assembly, conveyor track section, and chain tensioner-ramp assembly for a car wash conveyor of this type. The conveyor track sections have intermediate and lower tracks for idle and return travel of the rollers, so that three tracks are provided including the upper track on which the activate rollers roll.

The track structure described therein has a frame of upright angles welded to longitudinal steel angle members forming upper and lower tracks. An intermediate track comprised of thick plastic angles resting on steel angles and are bolted through holes in the upper and vertical leg of the steel angle. Separate upper pieces support lateral tire guides.

The use of vertical angles as the main frame support establishes that the intermediate and lower tracks to be of equal width. Since the intermediate track is defined by the combination of a single steel angle and a plastic angle, the lower track, which is constructed of a steel angle alone, is somewhat wider. This allows the chain to wander, increasing chain wear by the lack of confinement of the chain rollers.

This construction also involves extra labor in locating and drilling holes for the plastic angles, as well as in separately constructing and attaching the upper tire guide support pieces. The longitudinal members also vary in length, adding to the complexity of fabricating the track structures.

The entrance section of such conveyors includes a chain tension take up mechanism, including a take up drum around which the conveyor chain passes the take up drum mounted on slides and spring urged outwardly to establish proper chain tension. A roller control mechanism is also located at the entrance section for causing a selected roller to move up a ramp onto the upper track where it can engage a vehicle tire. The roller control includes a pair of ramp members connected to form a pivoted fork, which when raised by an actuator, diverts the rollers on one end of the next roller assembly to be guided up to the upper track for engagement with the next vehicle's tire.

These mechanisms are mounted to two of the longitudinal frame pieces extending between vertical angle pieces. If maintenance is required on either mechanism, this location makes it difficult to work on, and/or to remove the mechanisms for service.

The fork member in the roller control mechanism has rubber cushions installed on impacting portions to quiet the operation, but these cushions typically become dislodged such that noisy operation results.

The take up drum is mounted on bearings which are located within the frame and are difficult to reach for routine maintenance and subjects them to water and dirt dripping down from the car wash sprays and dirt curved down with the spray water.

Accordingly, it is an object of the present invention to provide a simpler, track construction for a car wash conveyor which can also easily provide properly spaced track sections for the lower track.

It is another object to provide a tension take-up and roller control fork mechanisms for a car wash conveyor which allows easier access for maintenance, and improves the performance of those mechanisms in service.

SUMMARY OF THE INVENTION

These and the other objects of the present invention which will become apparent upon a reading of the present specification and claims are achieved by constructing the track structure with the use of support frames cut out from plate stock to have webs for supporting the top, intermediate, and lower tracks.

The support frames allow the opening for the intermediate track to be wider to compensate for the thickness of the plastic angles and the lower track opening narrower to provide close guidance of the conveyor chain and rollers.

The support frames have integral tire guide roller supports to eliminate the need for separate support pieces.

The upper track comprises inverted angles which are spaced from an upper leg of an intermediate track support angle to form a lengthwise slot on each side of the track structure.

The plastic track angles are fastened by bolts passed through the slot and holes in the plastic tracks to eliminate the need for drilling holes in the metal pieces aligned with the holes in the plastic track angles.

The roller control and chain take up mechanisms are mounted at the entrance of the conveyor as a self contained a unit comprised of two pairs of parallel rods connected at each end to a respective end plate. The entrance track section is configured to allow easy removal of this unit without disturbing the track structure.

The take up drum support shaft is rotatably mounted on a pair of side support plates each slidable on journals received on respective one of the pairs of the rods. Bearings for the drum support shaft are installed on the outside of the side support plates to enable ready access and to minimize exposure to the water spray and drippage.

The fork of the roller control mechanism is carried on a pair of support side plates which are adjustably mounted on the four rods of the unit assembly. Two sets of cushioning stops are securely mounted to side and end plates located to engage fork members to quiet the operation thereof.

The entire assembly is readily detachable to be removed from the entrance track section as a complete unit for convenient servicing.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
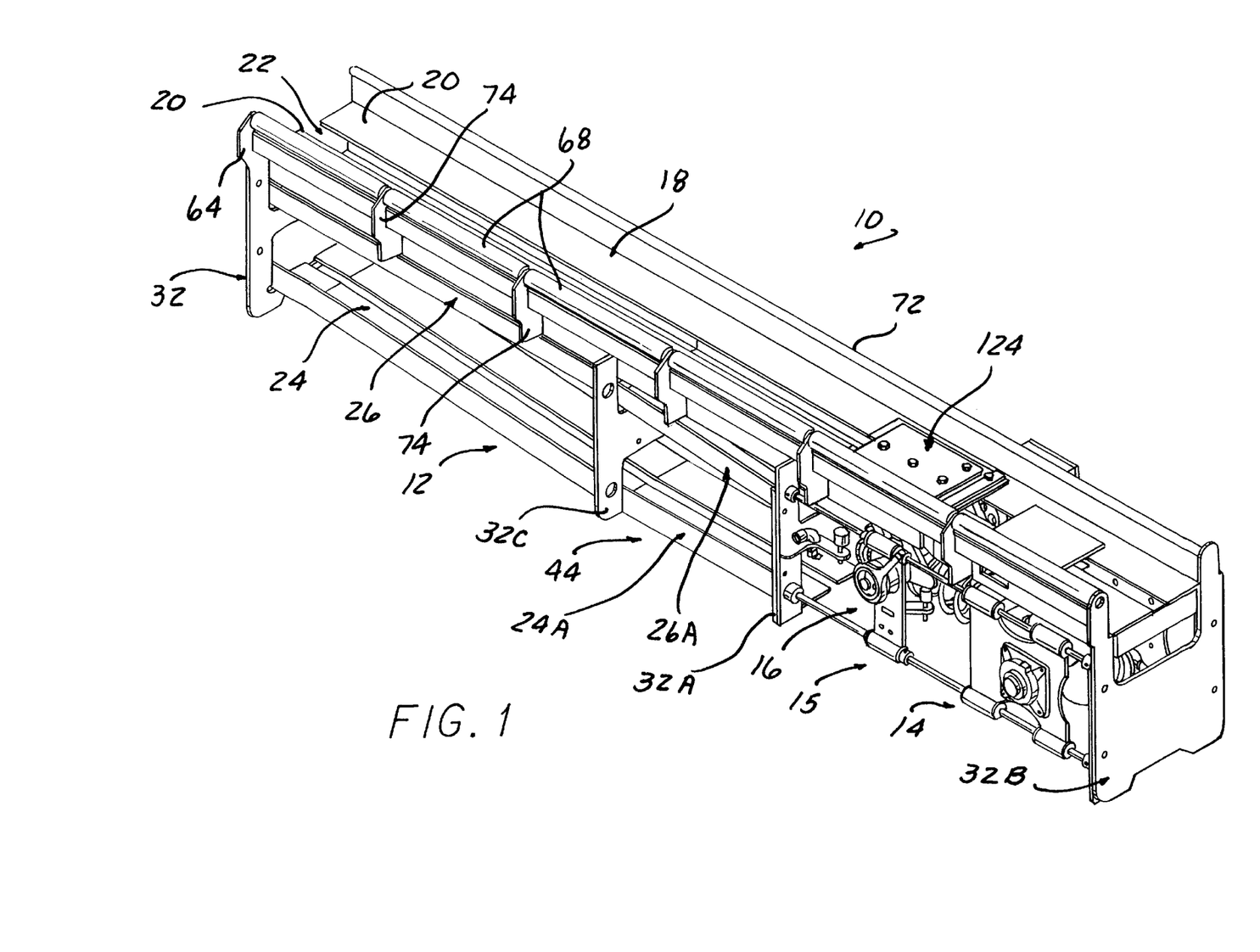
FIG. 1 is a perspective view of an entrance conveyor section of an auto wash conveyor incorporating the improvements of the present invention.

Referring to FIG. 1, an entrance section 10 for an auto wash conveyor is shown, which includes a three tier frame structure 12. A chain take up mechanism 14 and roller control mechanism 16 are mounted as a unit 15 at the entrance end of the entrance conveyor section 10 as will be described below in additional detail.

An upper track 18 is defined by two separate angles 20 separated to form a slot 22 through which an elevated roller assembly 80 extends. A car's tires roll along the flat surface defined by the top of each angle 20, pushed along by an elevated roller assembly having one roller set moving along on the top of the angles 20 so as to engage the car's tire to push the same down the track by the pull of the roller chain.

U.S. Pat. No. 4,864,936 describes one type of suitable roller assembly, while pending U.S. application Ser. No. 09/260,321, filed on Mar. 1, 1999 describes another roller assembly design. Other roller assembly designs are commercially available and well known.

A lower track 24 provides a return track for the roller assemblies 80, and an intermediate track 26 receives roller assemblies 80 which are being pulled in a forward direction but have not been activated by causing one end to be diverted up to the top track by selective operation of the roller control mechanism 16 in the well known manner.

Figure 2:
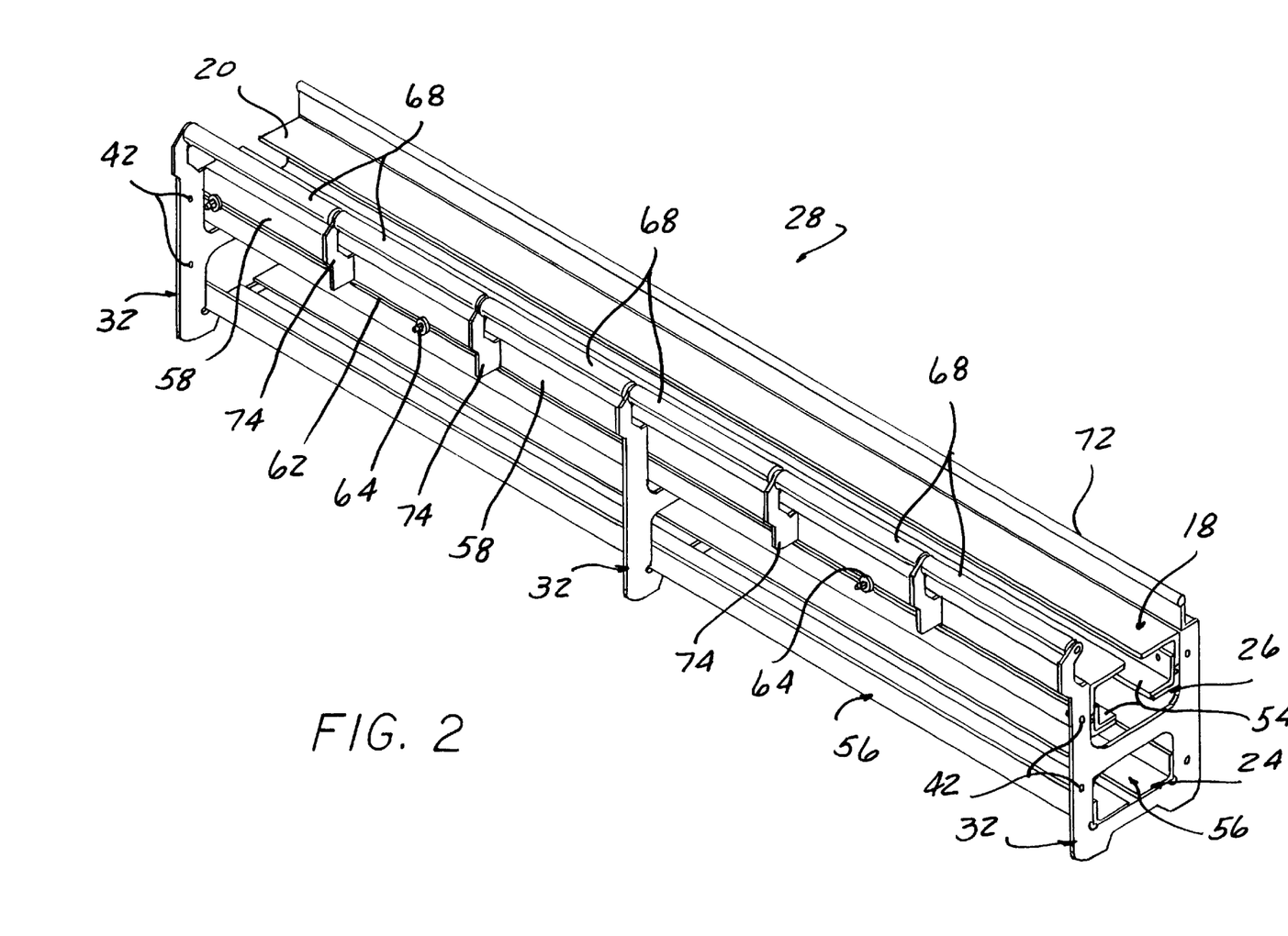
FIG. 2 is a perspective view of an intermediate conveyor section of an auto wash conveyor according to the present invention.
Figure 3:
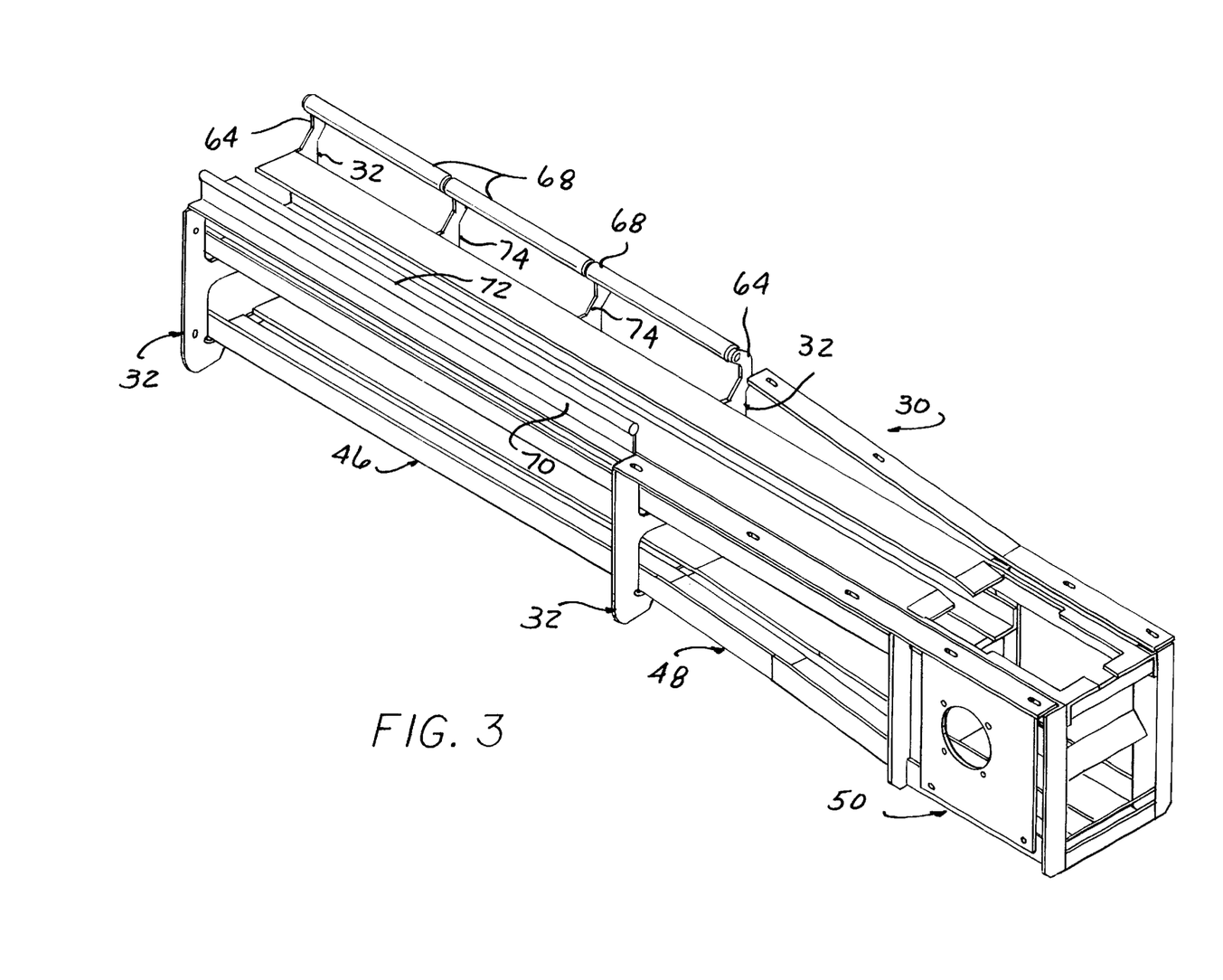
FIG. 3 is a reverse side perspective view of an exit conveyor section for an auto wash conveyor.
Figure 4:
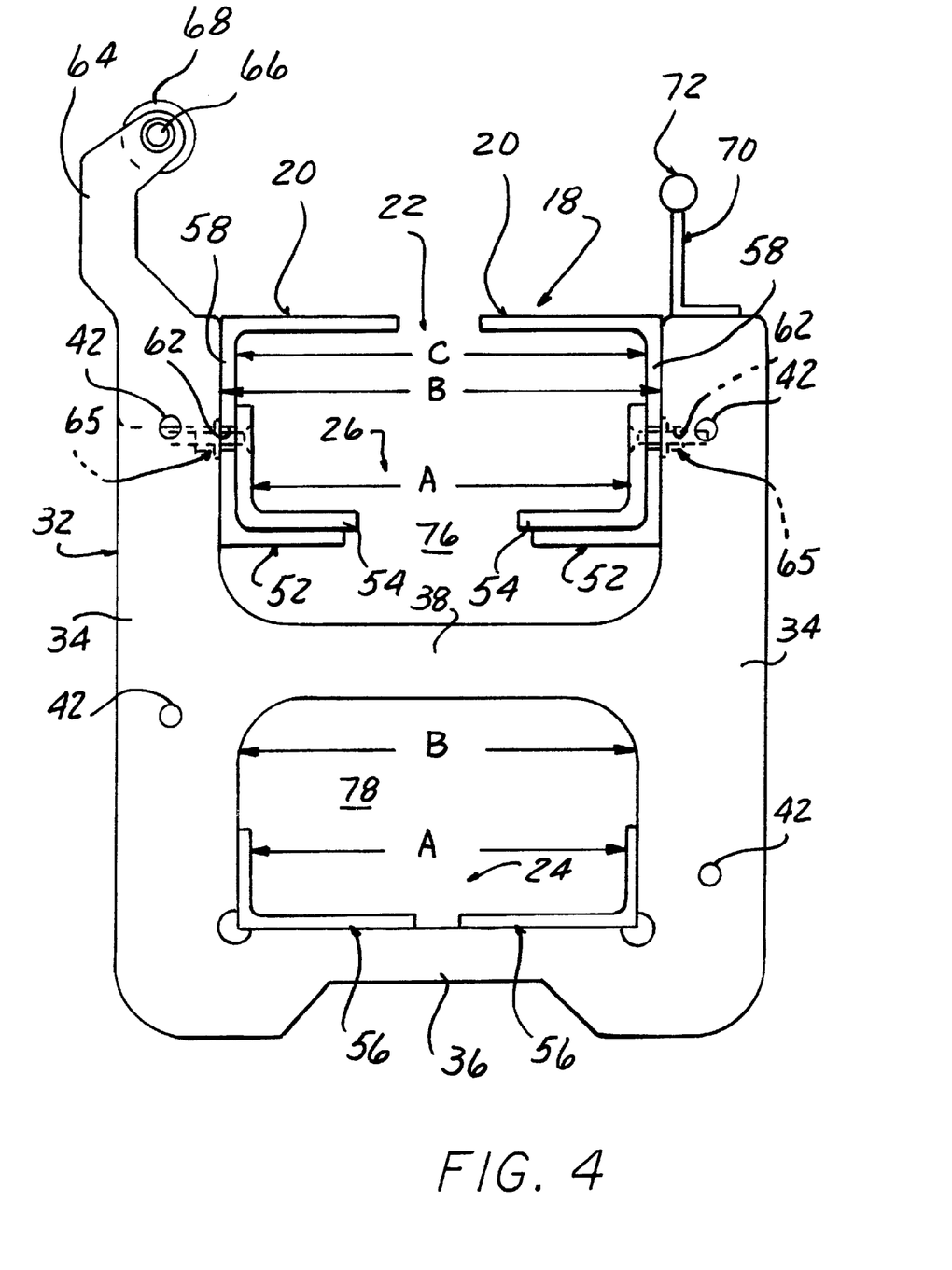
FIG. 4 is an end view of an auto wash track structure incorporated in each of the conveyor sections shown in FIGS. 1–3.

The nature of the track structure is best understood by reference to FIGS. 2–4. An intermediate conveyor section 28 (FIG. 2) is used between the entrance conveyor section 10 and an exit conveyor section 30 (FIG. 3) each having the upper track 18, lower track section 24, and intermediate track 26.

A series of flat steel support plates 32 are cut out by such processes as plasma cutting, water jet cutting, etc. into the modified "H" contour shown, comprised of a pair of legs 34 connected at the bottom by a lower web 36 and an intermediate web 38.

The upper track 18 includes the pair of steel angles 20, each having one side lying horizontally and spaced apart to define the slot 26. The angles 20 extend between two support plates 32 located at a respective end of a track segment of the entrance conveyor section 10, the entire length of the intermediate conveyor section 28, and a mid point location of the exit conveyor section 30. Modified flat plate supports 32A and 32B are used in the entrance section 10 on either end of the chain take-up mechanism 14 and roller control mechanism 16.

Each support plate has a series of holes 42 for bolting adjacent conveyor sections together, and in the case of supports 32A, 32B to mount the unit 15.

The entrance section 10 has a transition segment 44 supported by a flat plate support 32A and 32C, which transition segment has a downwardly sloping lower track 24A to properly position the roller assemblies (not shown) to be able to pass around the chain take up mechanism 14.

The intermediate conveyor section 28 has an additional plate support 32 at a point intermediate the ends of the section 28 (which does not require the holes 42).

The exit conveyor section 30 (FIG. 3) has a straight segment 46 and a transition segment 48 to a chain drive mounting structure 50, comprised of a welded angle/plate construction for housing a conventional chain sprocket drive and exit trap door (neither shown).

The flat plate supports 32 are welded to lengthwise extending downturned angles 20 defining upper track 18, upturned angles 52 supporting UHMW plastic angles 54 forming the intermediate track 26 (FIG. 4), and upturned angles 56 forming lower track 24.

The downturned sides 58 of angles 20 and upturned sides 60 of the angles 52 are spaced to form a longitudinal slot 52 which is able to receive screw and nut attachments 65 for the UHMW angles 54 without the need for locating and drilling holes in the steel structure.

The plate supports 32 and 32B each have upwardly projecting portions 64 (FIG. 4) serving as stanchions for steel rods 66 on which are received a series of UHMW plastic rollers 68 serving as tire guides extending alongside the conveyor sections.

A series of extra intermediate stanchions 74 are welded to the downturned leg 58 of the upper track angles 20 to provide additional support.

An upright angle 70 is welded atop the other side of the supports 32, to which a steel bar 72 is welded, serving as an inside tire guide.

The use of the plate supports 32, 32A, 32B, 32C for the tracks 18, 24, 26 has a particular advantage in that the width of the upper cut out 76 can be made greater than the width B of the lower cut out 78 (FIG. 4), since straight angle members are not used and any contour can be cut in fabricating the supports 32, 32A, 32B, 32C. Thus, the inside spacing C between the angles 52 may be set to be slightly wider than the width B of the lower cut out 78 to set the track width A the same, and to closely confine the chain 82 and roller assemblies 80 (FIGS. 5, 6, 8) along both the intermediate track 26 and lower track 24, which in turn reduces chain wear.

Figure 5:
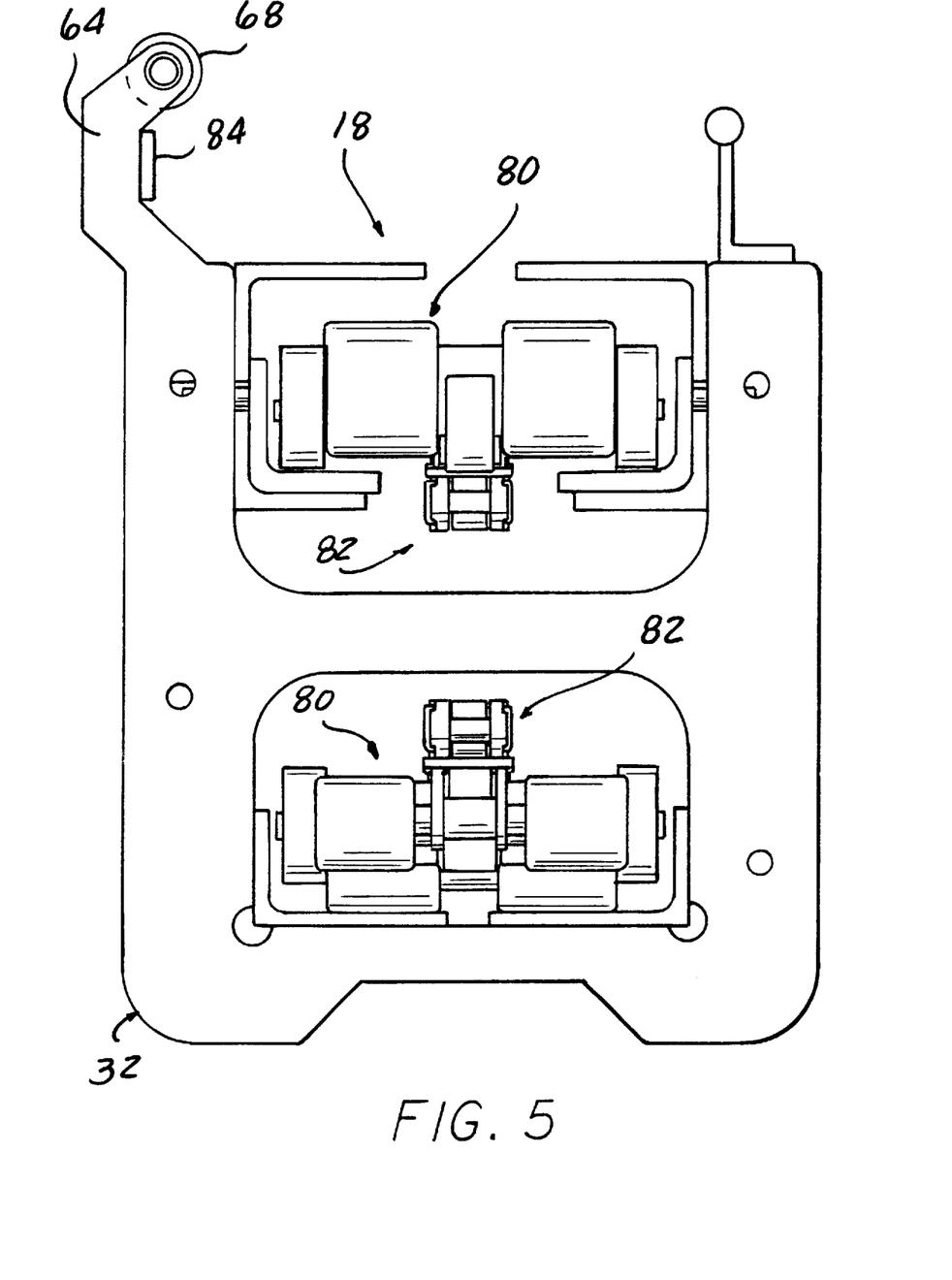
FIG. 5 is an end view of the auto wash track structure shown in FIG. 3 with the chain and pusher rollers installed.
Figure 6:
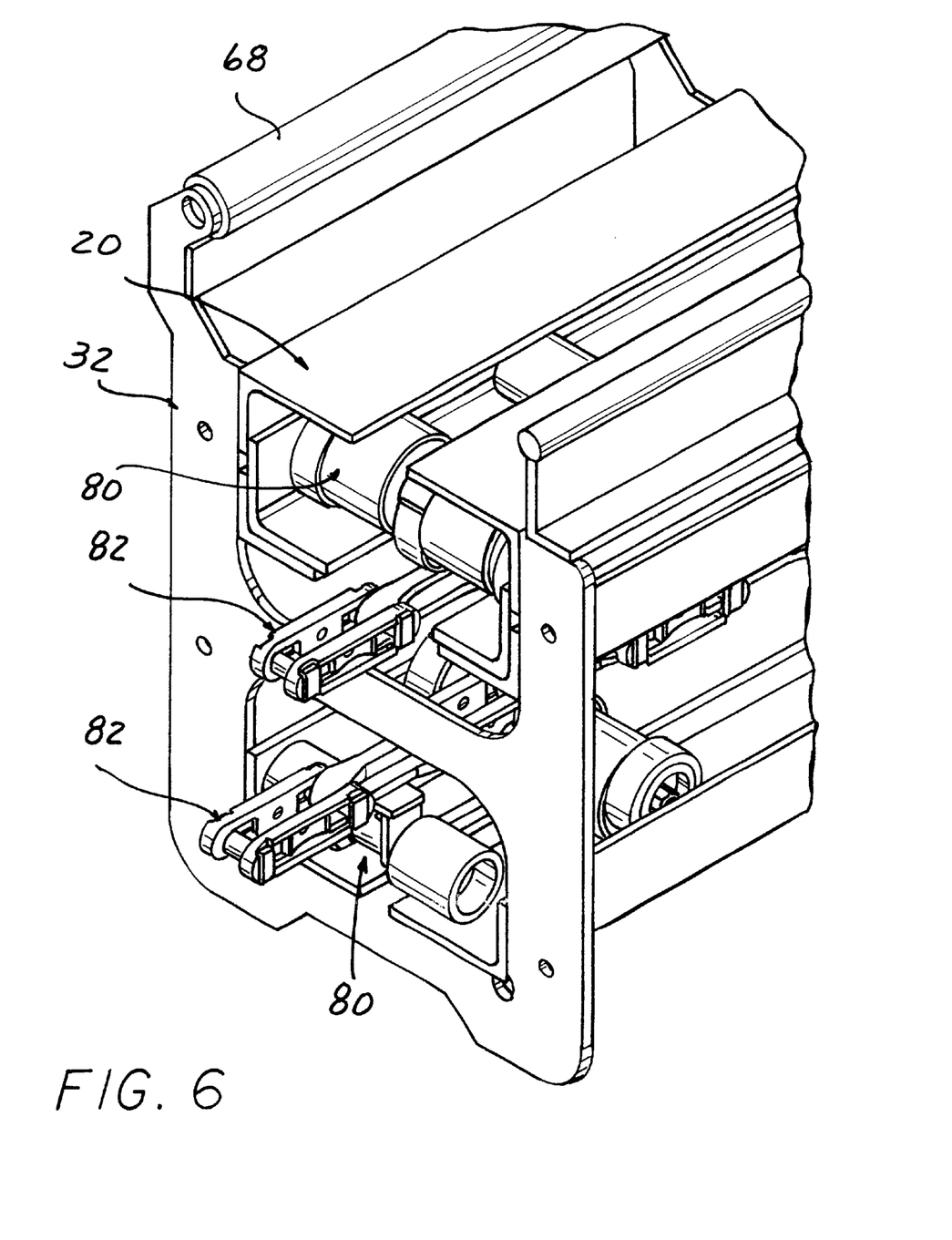
FIG. 6 is a fragmentary perspective view of one end of an intermediate track structure showing the chain and pusher rollers installed thereon.

Also, as seen in FIG. 5, a toe plate 84 is welded to the inside of the projections 64 stanchions 74 to block a person's toes from entering the space above the track 18, needed for safety considerations.

Figure 7:
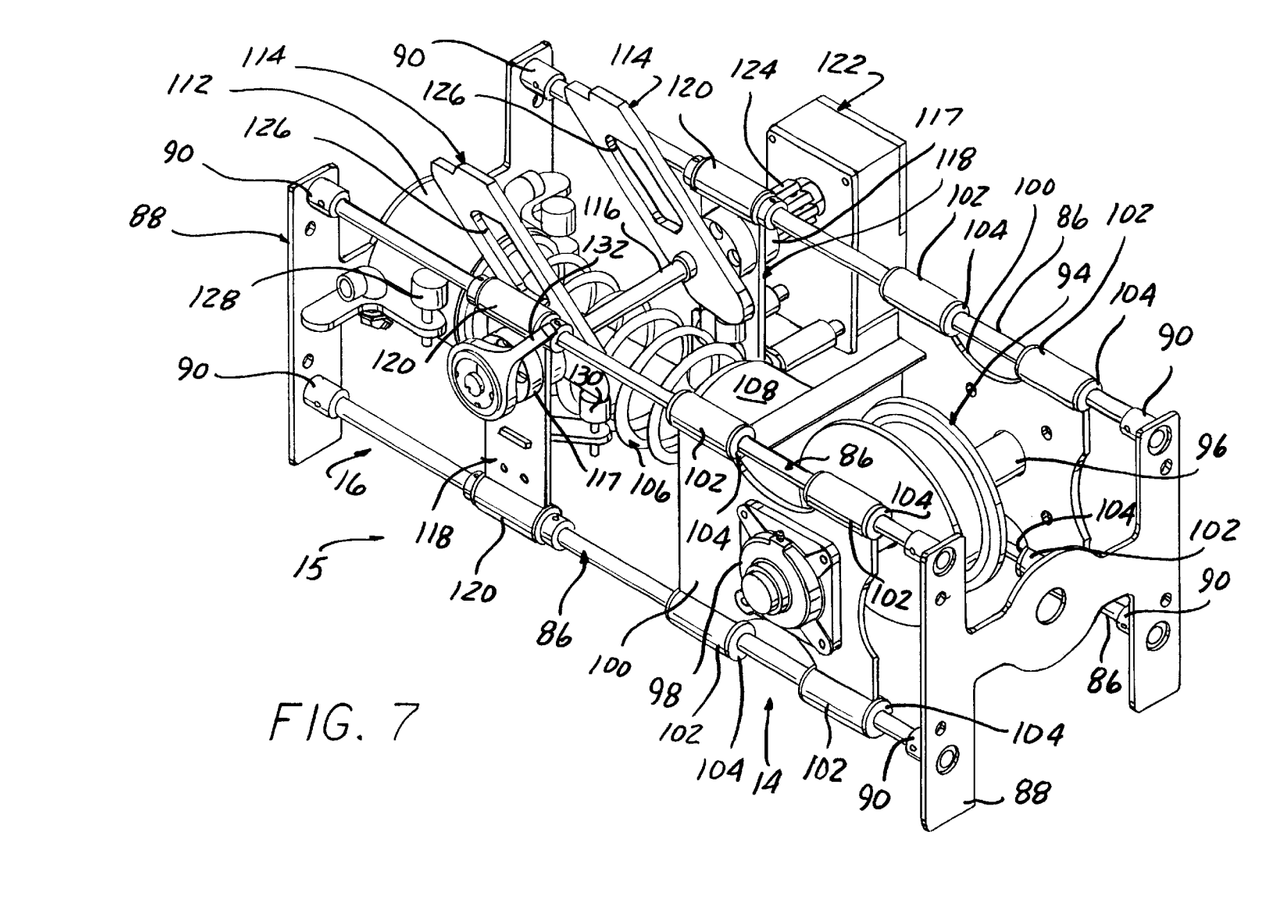
FIG. 7 is an enlarged perspective view of a take up and roller control mechanism unit installed in the conveyor entrance section.

FIG. 7 shows the separate unit 15 removed from the conveyor track structure as a self contained unit.

Four parallel stainless steel rods 86 are arranged in a rectangular pattern symmetrical with respect to the axis of the chain 82, attached at either end to H-shaped end plates 88 by couplings 90 having cross bolts (not shown) to secure the shaft ends therein.

The chain take up mechanism 14 includes a take up driver 94 rotatably mounted by a shaft 96 supported on bearings 98 located on the outer side of a respective one of a pair of mounting plates 100.

The mounting plates 100 are each slidable on the shafts 86 by means of pairs of slider journals 102 on each shaft 86 (using UHMW bearing sleeve 104).

A tension spring 106 is compressed between spring seat 108, fixed to a plate 110 extending between the side plates 100 to move therewith, and spring seat 112 fixed to end plate 88.

The roller control mechanism 16 selectively raises the unattached end of a roller assembly 80 to the upper track 18 to engage the tire of a car to be driven in the well known manner.

The roller control mechanism 16 includes a pair of fork members 114 mounted on a cross shaft 116 pivotally supported with bearings 117 on side plates 118. Side plates 118 are each adjustable on the rods 86 by pairs of collars 120 secured in an adjusted position by set screws installed in the collars 120.

A direct drive actuator 122, as described in U.S. Pat. No. 4,864,936, is directly connected to shaft 116 with a coupling 122 so that power pivoting of the shaft can be executed to move the fork members 114 to the up position shown, which causes the set of free end rollers to be routed up through the trap door 124 (FIG. 1) onto the upper track section 18.

The fork members 114 have lightening openings 126 to reduce their mass.

Cushioning stops 128 and 130 are located to quiet the impact of the fork members 114 in moving to the up and down positions.

A handle (not shown) can be placed over exposed lever 132 for manual operation.

The entire unit 15 can be installed or removed from the conveyor for easier maintenance.

Figure 8:
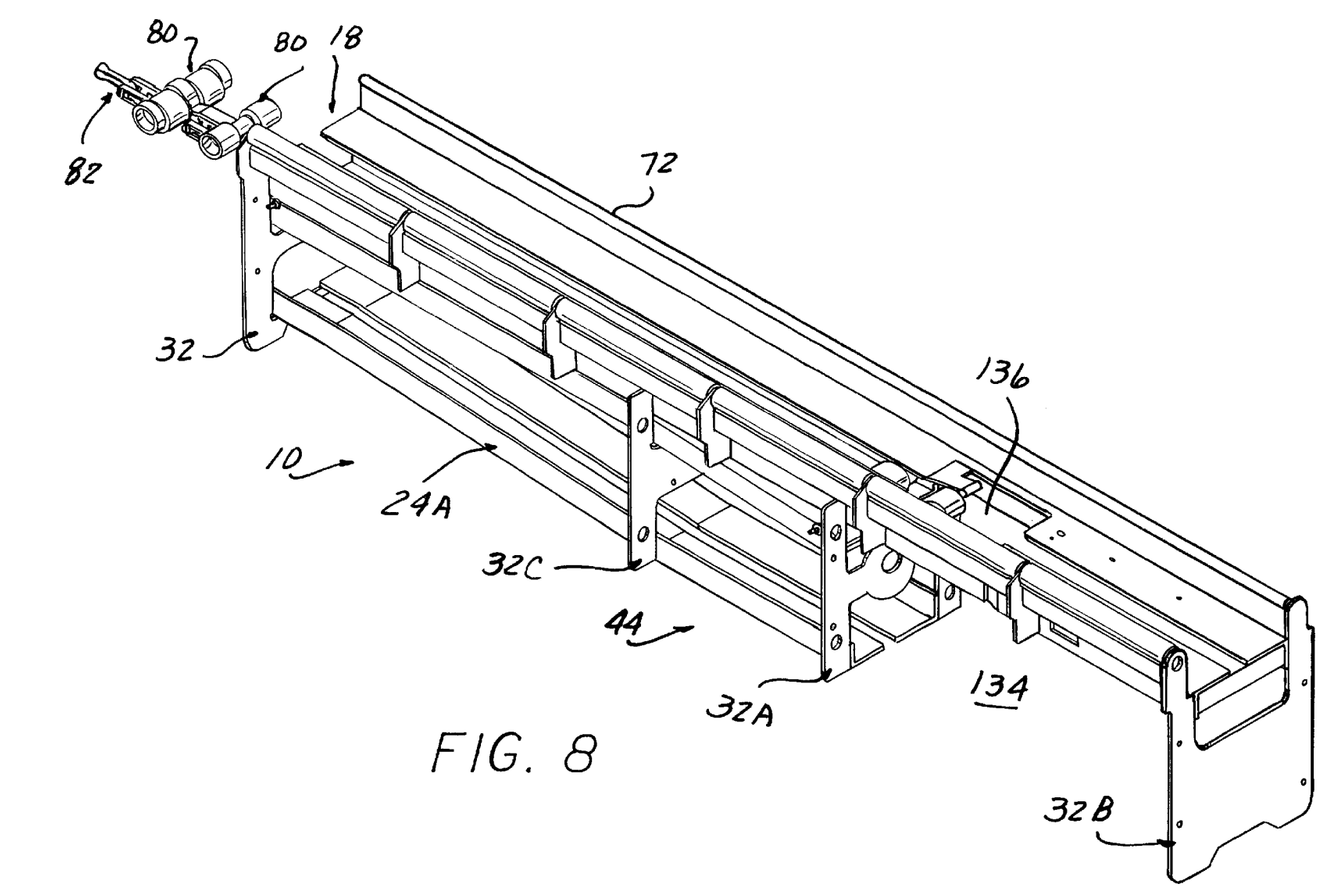
FIG. 8 is a perspective view of the conveyor entrance section from above, with the chain take up and roller control unit removed.
Figure 9:
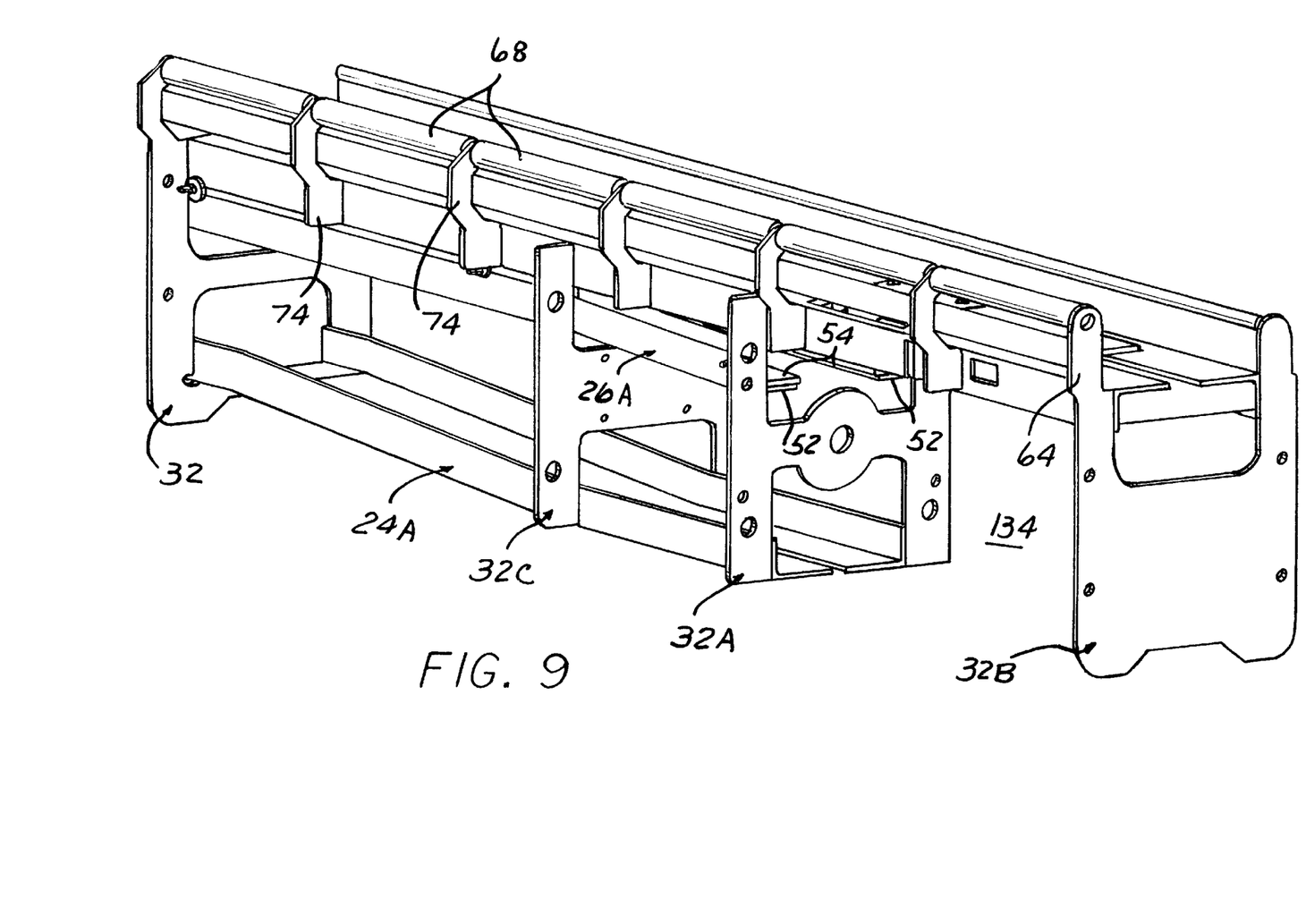
FIG. 9 is an enlarged frontal perspective view of the conveyor entrance section as shown in FIG. 8 with the unit removed.

FIGS. 8 and 9 show that the entrance section 10 is specially configured to allow removal of the unit 15 without disturbing the track structure. The intermediate track 26, and lower track 24 both terminate at the entrance end to create a cavity 134 bounded by support plates 32A, 32B. The upper track 18 extends over the cavity 134 and is supported by plate 32B. An opening 136 is provided overlain by the trap door 124 (FIG. 1). The chain 82 solely supports the roller assemblies 80 in this region.

A short segment 26A is supported of support plates 32A, 32C, is configured to slope downwardly and with the angles 52, 54 diverging from each other as shown in FIG. 9. This geometry insures recapture of the roller assemblies 80 as they move onto the intermediate track 26A after being supported solely by the chain 82 in passing over the unit 15. Thus, the slight sag of the chain 82 in that region can be accommodated.

The absence of the intermediate track section 26 and lower track 24 in that region allows a completely separate packaging of the chain take up and roller control in the unit 15, to enable its removal together as a separate assembly.

Accordingly, a lower cost fabrication cost can be achieved with the above described features by a reduction in labor. At the same time, improved performance in several respects also results as described.

What is claimed is:

1. In a car washer conveyor of the type including a track structure and a series of pusher roller assemblies carried along said track structure from an entrance end to an exit end by a driven chain to said said roller assemblies are attached which chain also returns said roller assemblies back to said entrance end, said roller assemblies able to be in an elevated or unelevated condition, said track structure including an upper track along which car tires and elevated roller assemblies can roll, an intermediate track along which unelevated roller assemblies can roll, and a lower return track along which all of said roller assemblies are returned to said entrance end of said conveyor, the improvement comprising a series of flat support plates spaced apart along the length of said track structure, each of a modified H shape, with a pair of flat upstanding legs connected together by an integral upper web located at an intermediate height on said legs and a lower integral web connecting said legs at a point adjacent a bottom end of said legs; said support plates having two open areas, a lower area between said upper and lower webs and said legs which accommodates said lower return track, and an upper open area between said legs and above said upper web which accommodates said upper and intermediate tracks.

2. The car wash conveyor according to claim 1 wherein said intermediate track is comprised of a separated pair of angles, each connected to a respective leg of each of said support plates at a point above said upper web and an overlying plastic angle attached to each angle, said return track comprised of another pair of angles each connected to a respective leg above said lower web, said upper and lower open areas of differing width to allow said plastic intermediate track angles and said return track angles to be spaced apart a substantially equal distance.

3. The car wash conveyor according to claim 2 wherein said upper track is comprised of a pair of downturned angles having an outer vertical side located spaced above a respective upturned side of each intermediate track angle to form a slot on each side of said conveyor, each of said plastic angles fastened to a respective one of said intermediate track angles by fasteners passing through said slot on respective sides of said conveyor.

4. The car wash conveyor according to claim 1 wherein each support plate has an integral upwardly projecting stanchion portion on each side, extending above said upper web, a support rod connected to said each stanchion portion.

5. A car wash conveyor according to claim 4 wherein plastic rollers are supported on each rod to act as a tire side guide.

6. A car wash conveyor of a type having a three tier track structure defining an upper track along which car tires and elevated roller assemblies roll from an entrance end to an exit end of said conveyor, an intermediate track along which non elevated roller assemblies roll, and a lower return track along which the roller assemblies are returned to said entrance end of said conveyor, said movement of said roller assemblies produced by recirculation of a chain to which said roller assemblies are attached, a chain take up mechanism for maintaining chain tension and a roller control mechanism for ramping up rollers on a selected roller assembly to said upper track, the improvement comprising a support arrangement separate from said track structure enabling installation and removal of said chain take up and roller control mechanism into and out of said conveyor as a separate modular unit into said conveyor, whereby installation, removal, and service of said chain take up and roller control mechanisms is facilitated.

7. The car wash conveyor according to claim 6 wherein said support arrangement includes four parallel rods arranged in a rectangular pattern symmetrical with respect to an axis of said chain, said rods connected at either end to a pair of end plates with said chain take up and roller control mechanisms mounted to said four parallel rods.

8. The car wash conveyor according to claim 7 wherein said take up mechanism includes a chain take up drive mounted on a cross shaft rotatably supported on a pair of side plates, each slidable on a respective pair of said rods.

9. The car wash conveyor according to claim 8 wherein said cross shaft is supported at either end on a rotary bearing mounted on the outside of a respective side plate.

10. The car wash conveyor according to claim 7 wherein said roller control mechanism includes a pair of fork members mounted on a cross shaft supported on a pair of side plates, each side plate mounted to a respective pair of said rods.

11. The car wash conveyor according to claim 10 wherein each of said side plates are slidably adjustable on said respective rod pairs.

12. The car wash conveyor according to claim 10 wherein a pair of cushioned stops are associated with each fork members for quieting movement of said fork members to said raised and lowered position.

13. The car wash conveyor according to claim 7 wherein said intermediate and lower track sections terminate at said separate unit.

14. The car wash conveyor according to claim 13 wherein said intermediate track comprises an end section of spaced angles diverging and sloping down to recapture rollers passing off said separate unit.

* * * * *

UNITED STATES PATENT AND TRADEMARK OFFICE
CERTIFICATE OF CORRECTION

PATENT NO. : 6,422,153 B1
DATED : July 23, 2002
INVENTOR(S) : Gilbert J. Reitsch, Jr.

It is certified that error appears in the above-identified patent and that said Letters Patent is hereby corrected as shown below:

Column 5,
Line 57, delete "said".
Line 58, delete "which".

Signed and Sealed this

Fifth Day of November, 2002

*Attest:*

*Attesting Officer*

JAMES E. ROGAN
*Director of the United States Patent and Trademark Office*